April 9, 1935.  P. ZIMMERMANN  1,996,784
INDICATOR FOR BURDEN LEVEL OF BLAST FURNACES
Filed April 21, 1931  2 Sheets-Sheet 1
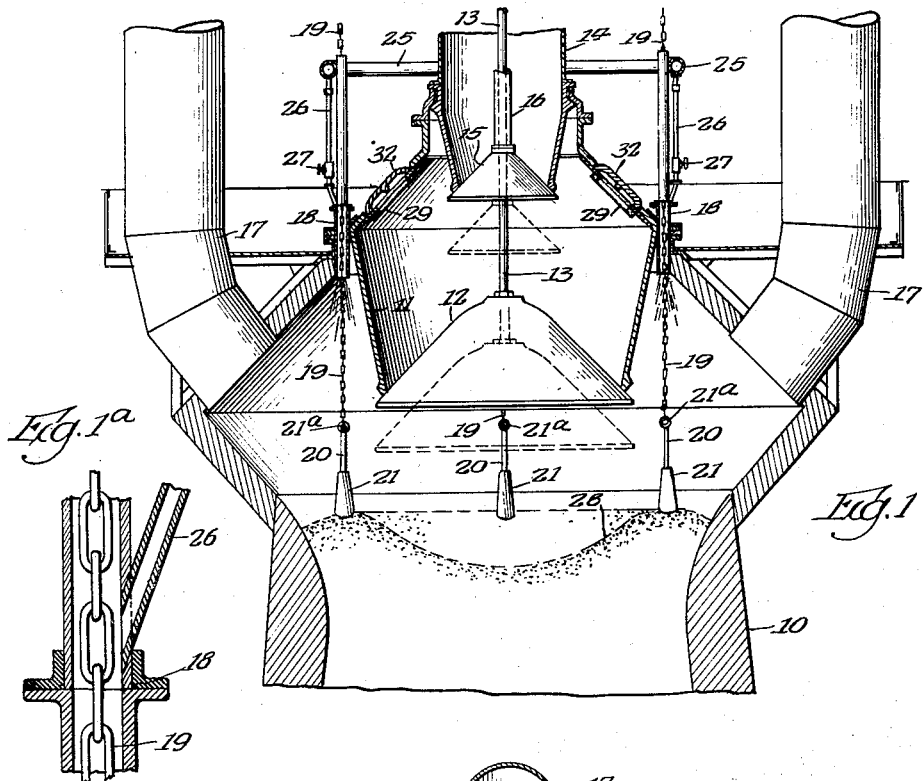
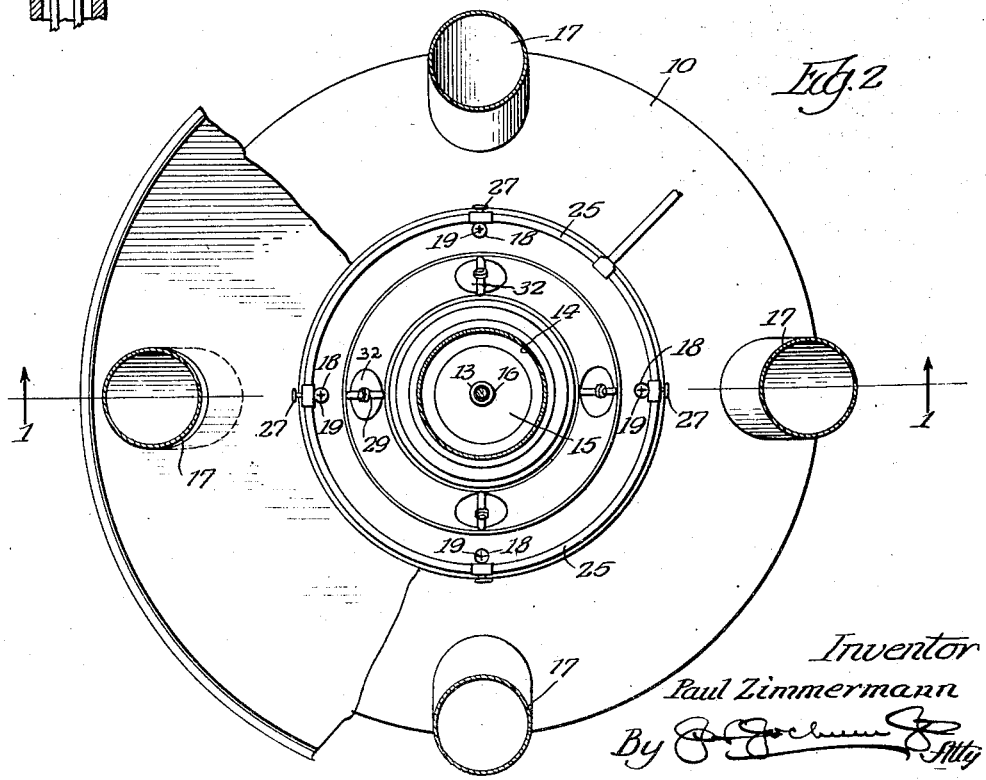
Inventor
Paul Zimmermann April 9, 1935. P. ZIMMERMANN 1,996,784
INDICATOR FOR BURDEN LEVEL OF BLAST FURNACES
Filed April 21, 1931 2 Sheets-Sheet 2
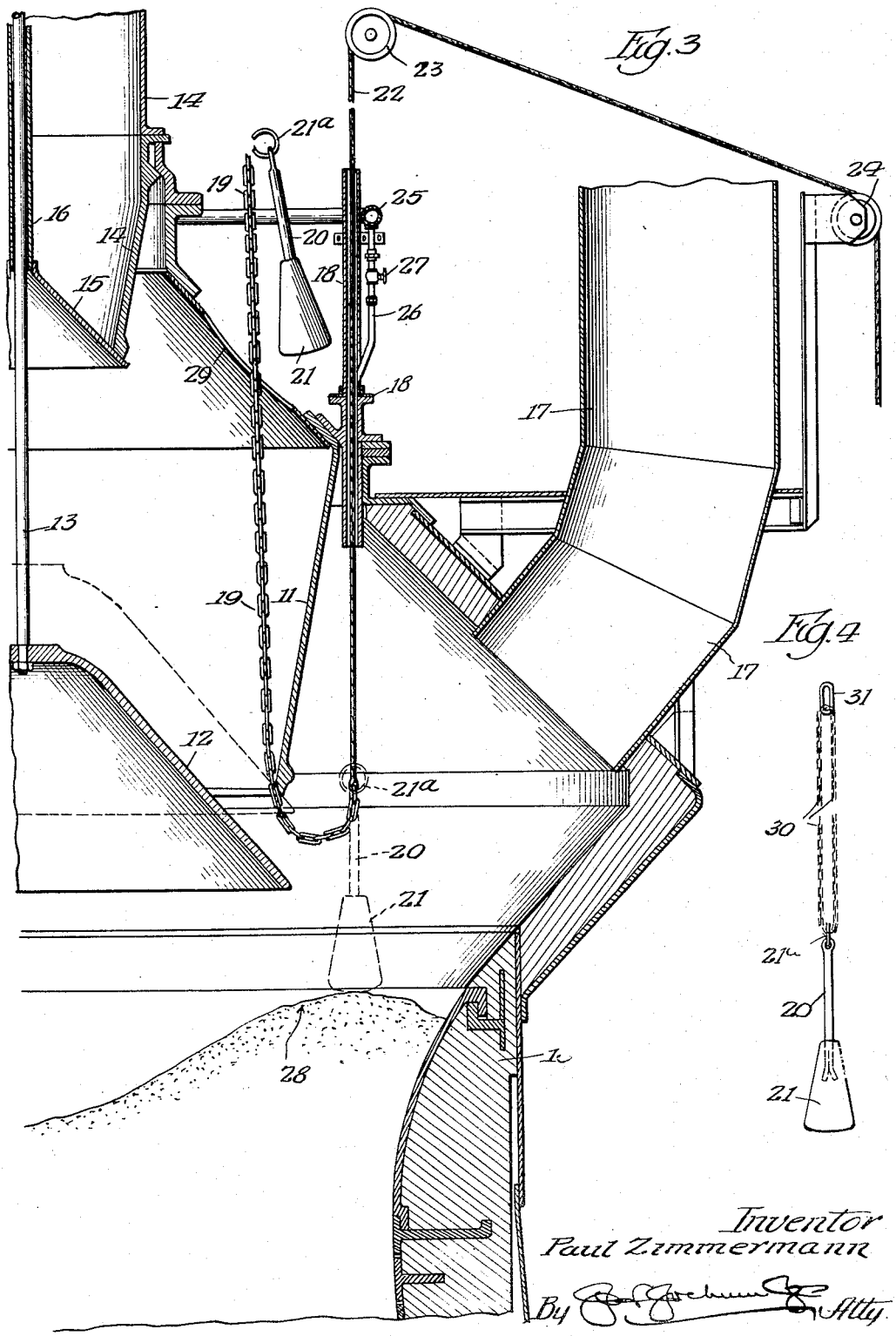
Inventor
Paul Zimmermann Patented Apr. 9, 1935

1,996,784

UNITED STATES PATENT OFFICE 1,996,784

INDICATOR FOR BURDEN LEVEL OF BLAST FURNACES

Paul Zimmermann, Chicago, Ill., assignor to H. A. Brassert & Company, Chicago, Ill., a corporation of Illinois Application April 21, 1931, Serial No. 531,841

4 Claims. (Cl. 33—125)

This invention relates to improvements in means for indicating or gaging the burden level of blast furnaces whereby the exact level may be readily ascertained at any time during the operation of the furnace, and at the same time provide an accurate chart or record of the operation of the furnace, and consists essentially of a flexible element for actuating an indicator which extends into the furnace from the outside thereof, and to which indicator is connected a test weight or element which engages and rests upon the burden or load in the furnace. As the level in the furnace falls the test weight will descend, drawing upon the flexible element, and as the latter passes to the outside of the furnace and is connected to a cable that passes over suitable guiding pulleys, and which cable is in turn connected with the stock line recorder, the extent and rapidity of descent or lowering of the test weight will be indicated by the recorder.

When a new charge is to be delivered into the furnace the indicator element is elevated or moved to an extent so as not to be interfered with by the entrance of the charge into the furnace.

A further object is to provide improved means for sealing the opening through which the flexible element passes through the wall of the furnace, whereby the escape of gases from the furnace will be prevented.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view of the upper portion of a blast furnace partly in section, partly broken away and with parts omitted, having a test weight for the burden level attached thereto in accordance with the principles of this invention, the view being taken on line 1—1, Figure 2.

Figure 2 is a top plan view of Figure 1, with parts omitted and with parts broken away.

Figure 3 is an enlarged detail sectional view similar to Figure 1, of a portion of the furnace.

Figure 4 is a detail elevation of a modified form of indicator elements.

Figure 1ᵃ is an enlarged detail sectional view of a portion of the tube for guiding the flexible member and of the steam inlet pipe.

Referring more particularly to the drawings the numeral 10 designates generally a portion of a blast furnace being provided with a supply hopper 11 closed by a bell 12 and which bell is operated in a manner well known in this art, through the medium of a rod 13 to open and close the hopper 11. The numeral 14 designates a small bell hopper which discharges into the hopper 11 and its delivery end is controlled by a smaller bell 15 which is actuated to open and close the same through the medium of a rod or tubular member 16 actuated in a manner well known in this art. Leading from the furnace are the usual gas outlets 17.

All of the above referred to parts are of the ordinary and well known construction.

Communicating with the interior of the furnace and preferably located at the top thereof are a plurality of tubular members or pipes 18 which are arranged uprightly and may be of any desired diameter and length. One end of the pipe or tube 18 preferably projects into the top of the furnace and the pipe is of such a length that it will extend for a considerable distance above the top of the furnace.

Extending through the pipe 18 is a flexible member 19 preferably in the form of a chain, the links of which are of such a size that the chain will pass freely through the pipe or tubular member. This chain is of any desired length and connected to the end thereof, preferably through the medium of a rod 20, is a weight 21. The end of the rod 20 may be provided with a suitable eye through which a ring or link 21ᵃ passes for connecting the same to the end of the chain 19. The other end of the chain 19 is connected to a cable 22 which passes over suitable guide pulleys 23—24 and the other end of the cable leads to a stock line recorder or hand winch (not shown). Any number of these pipes or tubular members 18 with the chain 19 passing therethrough and the element 20—21, as well as the cable 22, may be provided, but in the present form of the invention four are shown.

The numeral 25 designates a header which receives a supply of steam under pressure from any suitable source, not shown. Leading from this header 25 are a series of pipes 26 one for each of the pipes or tubular members 18, and each of these pipes 26 discharges into one of the tubular members 18 at any desired point, but preferably in proximity to the top of the furnace, and in a direction counter-current to the gas flow. Arranged in each of the pipes 26 is a control valve 27.

Steam is supplied to the header 25 under pressure and when the valves 27 are opened the steam will be discharged into the pipe or tubular member 18, thereby forming an absolute seal for the opening or pipe against any gas leakage through the chain inlets or pipes 18. The discharge of the steam into the pipes 18 will also serve as a means for preventing the plugging or stopping up of the pipes 18.

In use the charge is delivered into the small bell hopper 14 in the usual manner, the bell 15 being positioned to close the same to prevent the escape of gases from the furnace when the bell 12 is moved to open the hopper 11. When the bell 15 is moved to open the small bell hopper the bell 12 will be closed so that a charge will be delivered from the small bell hopper 14 into the hopper 11, after which the bell 15 is adjusted to close the small bell hopper and at the proper time in the operation of the furnace the bell 12 is adjusted to open the hopper 11 and thereby deliver the charge therefrom into the furnace.

Previous to the discharge of the load into the furnace by the opening of the bell 12, the flexible member or chain 19 is raised through the medium of the cable 22 so as to move the chain together with the weight 21 attached thereto, to a position that it will not be interfered with by the charge being delivered into the furnace. The chain or flexible member 19 is then lowered until the weight 21 rests upon the top of the burden or load 28. As the level of the burden 28 moves downward, the weight 21 and the flexible member or chain 19 will also move downward and follow the level, and this will draw upon the cable 22 to operate the stock line recorder. During the operation of the furnace a supply of steam is being discharged continuously from the pipes 26 into the tubular member or pipe 18 and as the pressure of the steam is greater than the pressure of the gases in the furnace in their attempt to escape through the pipes 18, there will be an absolute seal against the escape of the gases, the gases leave the furnace through the outlets 17.

Thus it will be seen that by the change of the level of the burden or load 28, the flexible member 19 and the weight 21 will actuate the stock recorder.

In order to install the apparatus on the furnace the chain 19, without the weight 21 attached thereto, is lowered through the pipe or tube 18 into the furnace. The bell 12 is opened either before or after the chain is lowered and then by means of a hook or other suitable implement inserted into the furnace through a man hole opening 29 and between the bell 12 and the outlet end of the hopper 11, the end of the chain 19 may be engaged by the hook and such end drawn out of the furnace through the hopper 11 and opening 29, after which the weight 21 may be attached to the chain and then dropped into the furnace over the large bell 12. Obviously the length of the chain 19 is such as to permit of this operation and when the weight is dropped back into the furnace it will be adjusted so that the chain 19 will be held taut and the weight will rest upon the top of the load.

In Figure 4 there is shown a modified form of indicator embodying the weight 21 with the stem or projection 20 and the flexible element 30 consists of a double chain sliding through the ring 21ª and also through a ring 31, to which latter the cable 22 is fastened. With this form of apparatus the chain 30 may be replaced without interference with the blast furnace operation, and when it is desired to replace the chain, the new chain is connected to one end of the old chain and is pulled through the ring 21ª without the necessity of taking the weights 21 out of the furnace.

Obviously, the openings 29 are closed by a suitable closure 32 during the operation of the furnace.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination, a blast furnace, an open extended tubular guide extending into the furnace from the outside through the wall thereof, a burden level gage, said gage extending into the furnace through said guide and freely movable therethrough, and means for discharging a fluid into said tubular guide in a direction counter to the gas flow from the furnace to form the only sealing means for the guide against gas leakage therethrough.

2. In combination, a blast furnace, an open ended tubular guide extending through the wall thereof, a burden level gage embodying a flexible member passing through said guide into the furnace from the outside thereof through said opening, said flexible member being freely movable through said guide by the change of level of the burden, and means whereby a fluid current counter to the flow of gas from the furnace may be provided for forming the only sealing means for the tubular guide through which said flexible member passes.

3. In combination, a blast furnace, an extended tubular member open at both ends and projecting into the furnace through the wall thereof, a burden level gage embodying a flexible member freely moving through said tubular member into the furnace and from the outside thereof by the change of level of the burden, and means whereby a fluid under pressure may be introduced into said tubular member at a point spaced from the extremities thereof to constitute the only sealing means for the tubular member against the flow of gas therethrough from the furnace.

4. In combination, a blast furnace, a burden level gage therefor, said gage embodying an extended open tubular member communicating with the interior of the furnace, a flexible member passing through said tubular member and freely movable therethrough, a burden engaging member connected with said flexible member, a steam pipe discharging into said tubular member, the steam forming the sole sealing means for the tubular member against gas leakage therethrough, and means controlling the discharge of steam into the tubular member.

PAUL ZIMMERMANN.